(12) United States Patent
Ikeno

(10) Patent No.: US 12,504,516 B2
(45) Date of Patent: Dec. 23, 2025

(54) LASER RADAR MOUNTING STRUCTURE

(71) Applicant: TOYOTA JIDOSHA KABUSHIKI KAISHA, Toyota (JP)

(72) Inventor: Eisuke Ikeno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 18/368,261

(22) Filed: Sep. 14, 2023

(65) Prior Publication Data
US 2024/0103135 A1 Mar. 28, 2024

(30) Foreign Application Priority Data
Sep. 22, 2022 (JP) ................ 2022-151625

(51) Int. Cl.
*G01S 7/481* (2006.01)
*G01S 13/931* (2020.01)
*B60R 11/02* (2006.01)

(52) U.S. Cl.
CPC .......... *G01S 7/4813* (2013.01); *G01S 13/931* (2013.01); *B60R 11/02* (2013.01)

(58) Field of Classification Search
CPC ...... G01S 17/931; G01S 17/89; G01S 7/4817; G01S 7/4813; G01S 17/42; G01S 17/86; G01S 7/484; G01S 7/481; G01S 7/4818; G01S 17/10; G01S 7/4802; G01S 7/4814; G01S 17/88; G01S 7/4815; G01S 7/4865; G01S 17/36; G01S 7/4811; G01S 13/931; G01S 2013/9327; G01S 17/04; G01S 7/003; G01S 2013/93273; G01S 13/86; G01S 13/867; G01S 2013/93271; G01S 7/4863; G01S 17/95; G01S 7/4816; G01S 7/497; G01S 2013/9316; G01S 13/723; G01S 13/87; G01S 2013/9318; G01S 2013/93185; G01S 2013/9319; G01S 2013/932; G01S 2013/9321; G01S 2013/9322;
(Continued)

(56) References Cited

U.S. PATENT DOCUMENTS 10,071,773 B2 * 9/2018 Williams ............... B62D 35/00
10,144,424 B2 * 12/2018 Hara ..................... G01S 13/931
(Continued)

FOREIGN PATENT DOCUMENTS

BR 112021003738 A2 * 5/2021 ............. B60R 11/00
CN 113615152 A * 11/2021 ............... B60R 1/00
(Continued)

*Primary Examiner* — Michael P Stafira
(74) *Attorney, Agent, or Firm* — Dinsmore & Shohl LLP

(57) ABSTRACT

A laser radar mounting structure is for mounting a laser radar to a vehicle. The laser radar has an irradiation unit configured to irradiate an electromagnetic wave for detecting an object around the vehicle. The laser radar mounting structure includes: an installation hole provided near a front pillar on a windshield of the vehicle, near a rear pillar on a rear glass of the vehicle, near the front pillar on a roof of the vehicle, or near the rear pillar on the roof of the vehicle; the laser radar provided in the installation hole; and a cover portion that covers the laser radar and transmits the electromagnetic wave. The laser radar is provided in the installation hole such that the irradiation unit faces the outside of the vehicle through the cover portion.

4 Claims, 5 Drawing Sheets

(58) Field of Classification Search
CPC .............. G01S 2013/9325; G01S 17/87; G01S
13/862; G01S 13/865; G01S 15/931;
G01S 19/13; G01S 7/4972; G01S 15/86;
G01S 17/894; G01S 17/93; G01S
2007/4977; G01S 2013/9314; G01S
2013/93272; G01S 7/027; G01S 15/50;
G01S 17/00; G01S 17/34; G01S 17/46;
G01S 2013/93276; G01S 7/03; G01S
7/48; G01S 7/4861; G01S 7/4914; G01S
13/20; G01S 15/08; G01S 17/003; G01S
17/08; G01S 17/933; G01S 7/4808; G01S
7/4812; G01S 7/4911; G01S 7/4915;
G01S 7/499; B60R 11/04; B60R 1/04;
B60R 1/088; B60R 1/12; B60R
2001/1223; B60R 2001/1253; B60R
1/089; B60R 2011/0033; B60R 16/023;
B60R 2300/301; B60R 1/28; B60R 1/26;
B60R 2011/004; B60R 2300/802; B60R
1/06; B60R 13/0206; B60R 13/0225;
B60R 2001/1261; B60R 2300/101; B60R
2300/105; B60R 2300/303; B60R
2300/602; B60R 2300/8046; B60R
21/0134; B60R 11/00; B60R 11/02; B60R
11/0211; B60R 2011/0005; B60R
2011/0022; B60R 2011/0026; B60R
2300/102; B60R 2300/106; B60R
2300/8093
See application file for complete search history.

(56) References Cited

U.S. PATENT DOCUMENTS

| | | | |
|---|---|---|---|
| 10,583,737 | B2 | 3/2020 | Chiba et al. |
| 10,922,561 | B2 | 2/2021 | Ozawa et al. |
| 11,247,671 | B2 | 2/2022 | Komori |
| 2019/0283658 | A1 | 9/2019 | Furui |
| 2021/0293933 | A1 | 9/2021 | Schmidt et al. |
| 2021/0354636 | A1* | 11/2021 | Higashimachi .......... H04N 7/18 |
| 2021/0364631 | A1 | 11/2021 | Hasegawa et al. |
| 2022/0111799 | A1* | 4/2022 | Hasegawa .............. B60R 11/04 |
| 2022/0169314 | A1 | 6/2022 | Huelen et al. |
| 2022/0413102 | A1* | 12/2022 | Li ........................ G02B 26/121 |

FOREIGN PATENT DOCUMENTS

| | | | | |
|---|---|---|---|---|
| CN | 114076929 | A | * | 2/2022 |
| CN | 216034218 | U | * | 3/2022 |
| DE | 102019122193 | B4 | * | 3/2021 ................ B60J 7/04 |
| JP | 2016-175447 | A | | 10/2016 |
| JP | 2019-164916 | A | | 9/2019 |
| JP | 2022-515426 | A | | 2/2022 |
| JP | 2022-536438 | A | | 8/2022 |
| KR | 20140006539 | A | * | 1/2014 |
| WO | WO-2020049892 | A1 | * | 3/2020 ........... G01S 13/865 |
| WO | WO-2022150196 | A1 | * | 7/2022 ........... B60R 16/023 |

\* cited by examiner

LASER RADAR MOUNTING STRUCTURE

TECHNICAL FIELD

The present disclosure relates to a laser radar mounting structure.

CROSS-REFERENCE TO RELATED APPLICATION

This application claims the benefit of priority from Japanese Patent Application No. 2022-151625, filed on Sep. 22, 2022, the entire contents of which are incorporated herein by reference.

BACKGROUND

Conventionally, there is known a lamp for vehicle in which a LiDAR unit for acquiring information on the outside of a vehicle is provided in an in-vehicle headlamp (for example, Japanese Unexamined Patent Application Publication No. 2019-164916).

In the above-described related art, a laser radar is provided in an in-vehicle headlamp. However, the installation height of the laser radar is restricted since the headlamp is mounted such that the installation height of the headlamp is equal to or less than a predetermined height due to regulations or the like. Therefore, it may be difficult to detect an object located far from the vehicle by the laser radar. On the other hand, it is desirable to consider an influence on the exterior appearance of the vehicle when the laser radar is mounted to a high position of the vehicle.

In the present technical field, it is desired to mount a laser radar to a high position of a vehicle while considering an influence on exterior appearance of the vehicle.

SUMMARY

A laser radar mounting structure according to an aspect of the present disclosure, the laser radar mounting structure is for mounting a laser radar to a vehicle, the laser radar having an irradiation unit configured to irradiate an electromagnetic wave for detecting an object around the vehicle, the laser radar mounting structure includes: an installation hole provided near a front pillar on a windshield of the vehicle, near a rear pillar on a rear glass of the vehicle, near the front pillar on a roof of the vehicle, or near the rear pillar on the roof of the vehicle; the laser radar provided in the installation hole; and a cover portion that covers the laser radar and transmits the electromagnetic wave. The laser radar is provided in the installation hole such that the irradiation unit faces an outside of the vehicle through the cover portion.

In the laser radar mounting structure according to one aspect of the present disclosure, the laser radar is provided in the installation hole. The installation hole is provided near the front pillar on the windshield of the vehicle, near the rear pillar on the rear glass of the vehicle, near the front pillar on the roof of the vehicle, or near the rear pillar on the roof of the vehicle. As a result, the laser radar can be mounted to a higher position of the vehicle than in the case where the laser radar is provided in the headlamp mounted on the vehicle, for example. The laser radar is provided near the front pillar or the rear pillar. The laser radar is covered with the cover portion that transmits the electromagnetic wave. As a result, the laser radar becomes less conspicuous when viewed from the outside of the vehicle, and thus it is possible to suppress the influence on the exterior appearance of the vehicle.

Therefore, according to the laser radar mounting structure according to one aspect of the present disclosure, it is possible to mount the laser radar at a high position of the vehicle while considering the influence on the exterior appearance of the vehicle.

In some examples, the laser radar may be provided in the installation hole such that the irradiation unit protrudes to an outside of the vehicle from the windshield or the rear glass.

In some examples, the installation hole may be provided at least at an upper right corner and an upper left corner of the windshield.

According to the laser radar mounting structure according to one aspect of the present disclosure, it is possible to mount the laser radar at a high position of the vehicle while considering the influence on the exterior appearance of the vehicle.

DETAILED DESCRIPTION

Hereinafter, embodiments of the present disclosure will be described with reference to the drawings.

Figure 1:
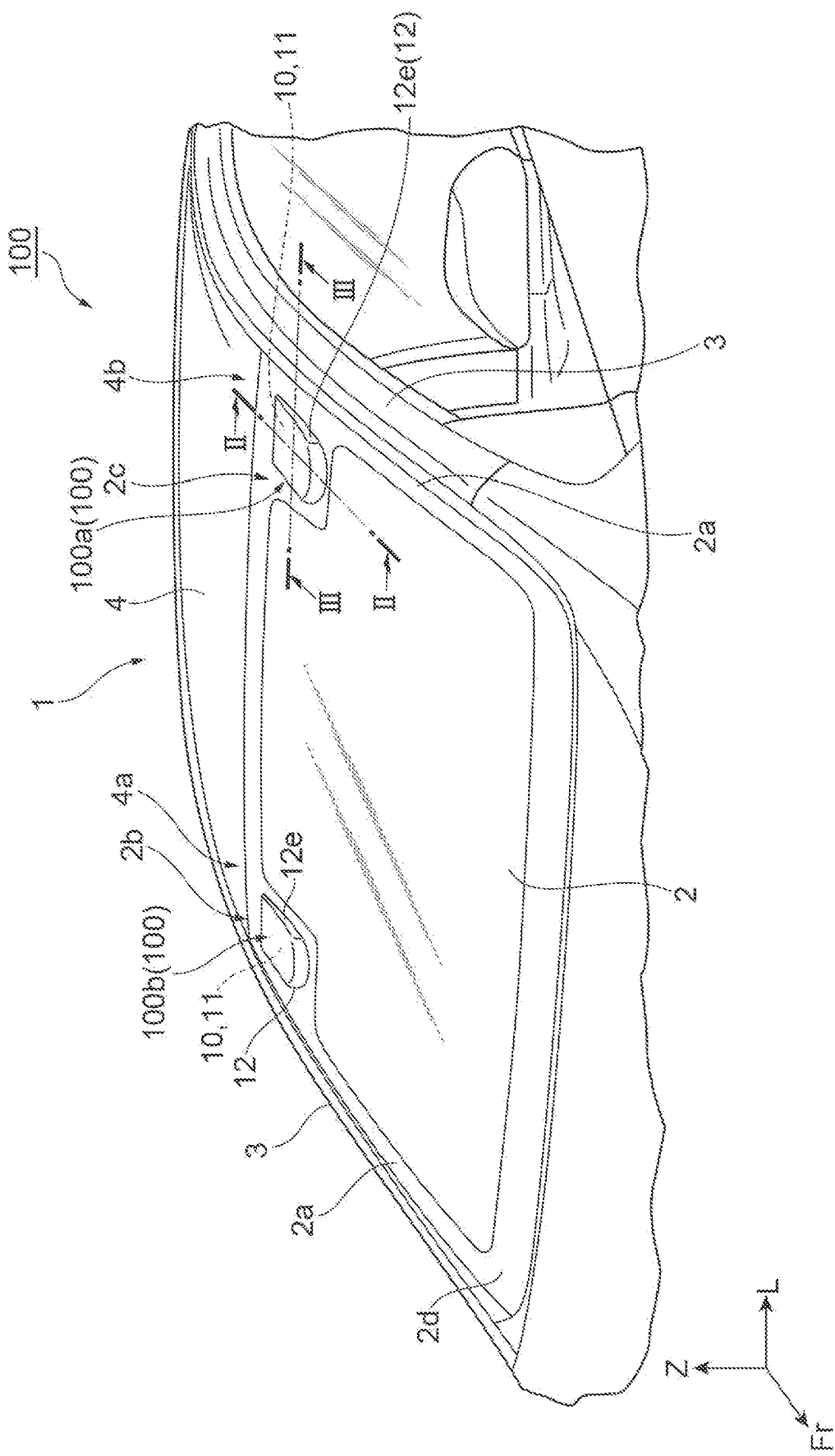
FIG. 1 is a perspective view illustrating a laser radar mounting structure according to an embodiment.
Figure 2:
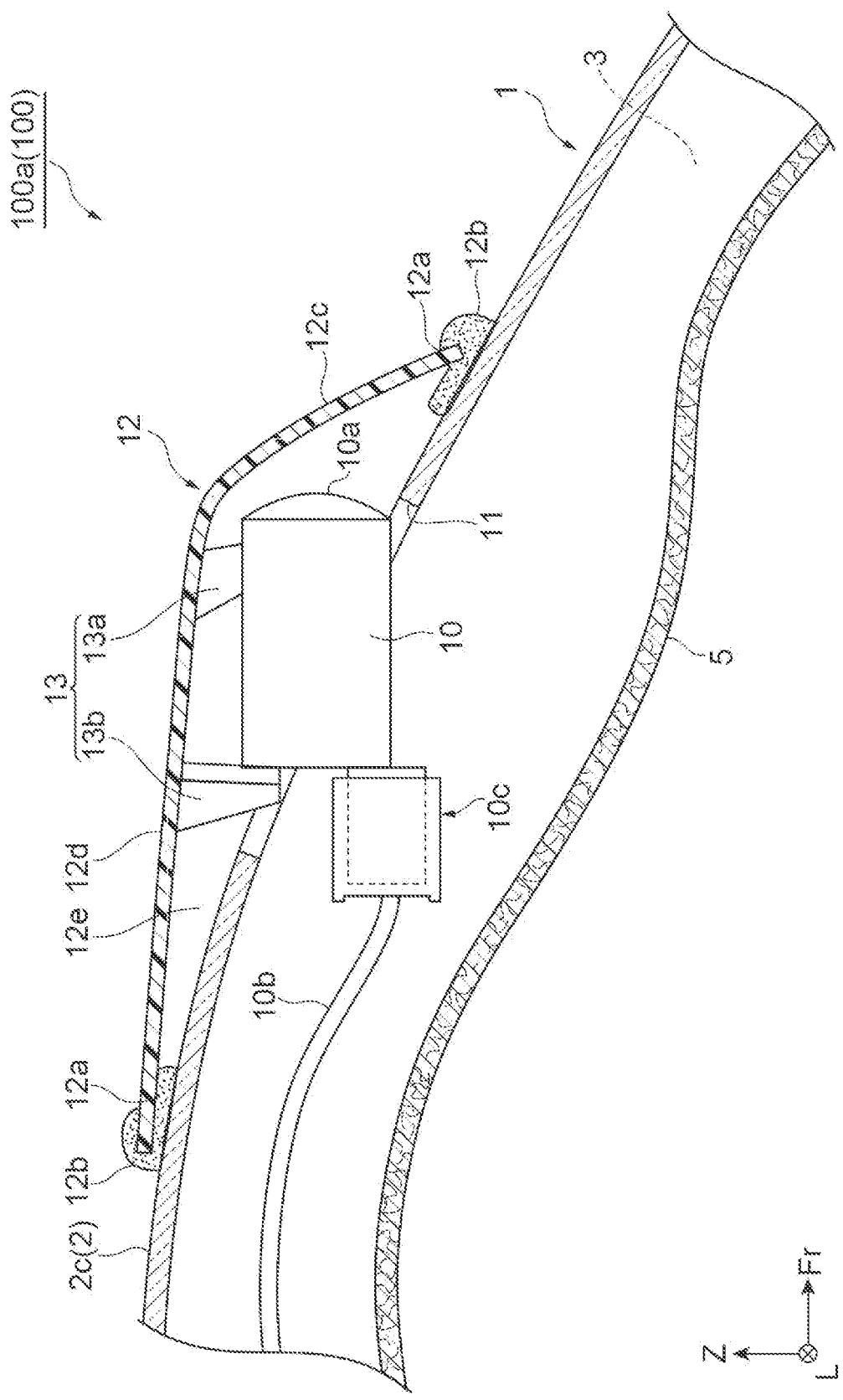
FIG. 2 is a schematic cross-sectional view taken along line II-II of FIG. 1.
Figure 3:
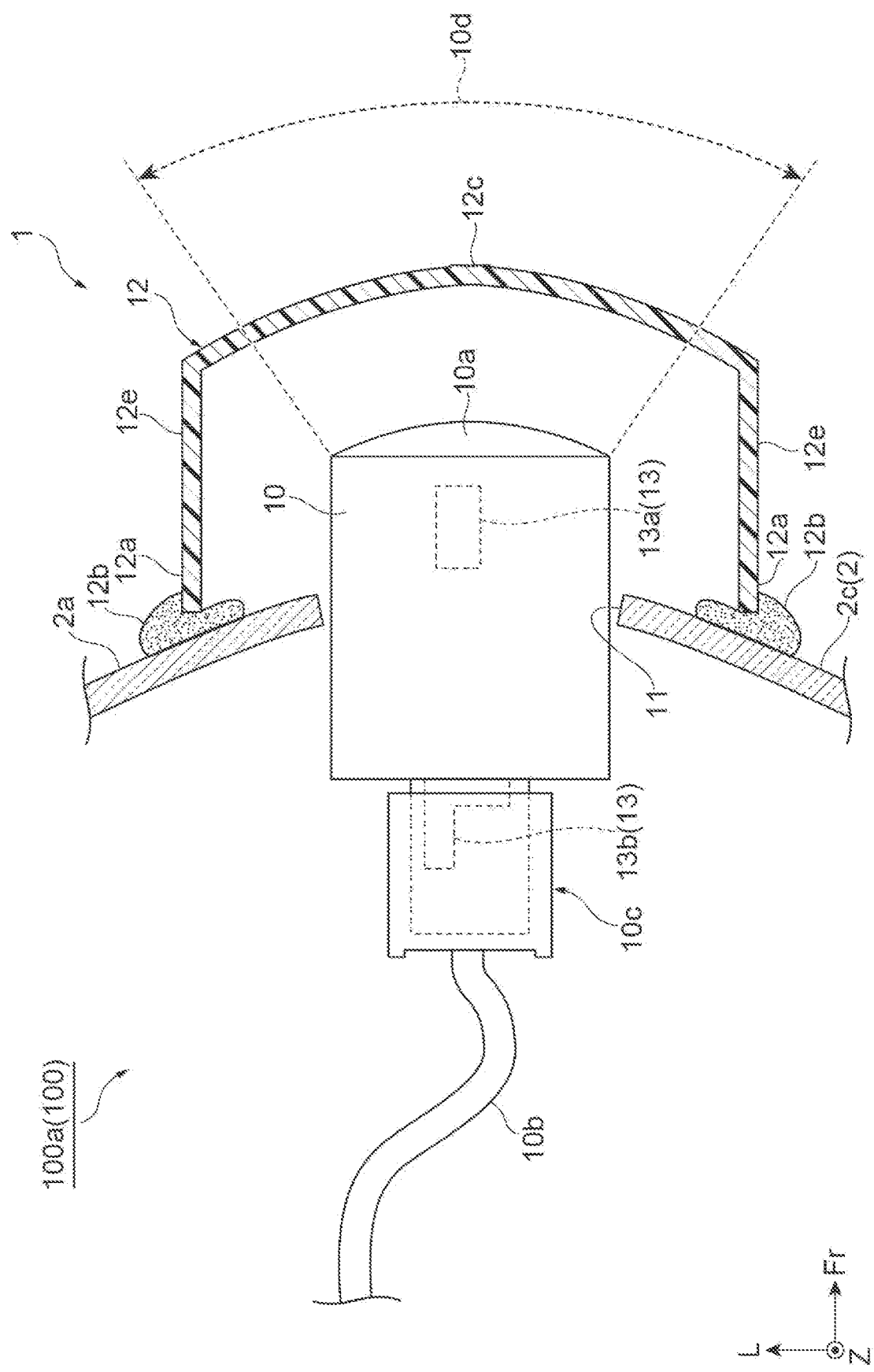
FIG. 3 is a schematic end view taken along line III-III of FIG. 1.

FIG. 1 is a perspective view illustrating a laser radar mounting structure according to an embodiment. FIG. 2 is a schematic cross-sectional view taken along line II-II of FIG. 1. FIG. 3 is a schematic cross-sectional view taken along line III-III of FIG. 1. In FIGS. 1 to 3, a three dimensional orthogonal coordinate system in which a front direction of a vehicle is Fr, a left direction of the vehicle is L, and an upper direction of the vehicle is Z is illustrated.

A laser radar mounting structure 100 of the present embodiment is a mounting structure that attaches a laser radar 10 to a vehicle 1. As shown in FIG. 1, the vehicle 1 is, for example, a passenger car. The vehicle 1 is configured to perform autonomous driving. Autonomous driving is vehicle control in which the vehicle 1 autonomously travel along a target route. In the vehicle 1, information of objects around the vehicle 1 detected by the laser radar is used for autonomous driving. A known configuration can be used as the configuration related to the autonomous driving. A detailed description of the configuration related to the autonomous driving will be omitted. The vehicle 1 is not limited to passenger cars capable of performing autonomous driving.

The laser radar mounting structure 100 includes a set of mounting structures 100a, 100b, each including a laser radar 10, an installation hole 11, a cover member (cover portion) 12, and a bracket 13. The laser radar mounting structure 100 includes, for example, a pair of left and right mounting structures 100a, 100b. The following description focuses on the mounting structure 100a located on the left side of the vehicle 1 among the pair of left and right mounting structures 100a, 100b. Redundant description of the other right mounting structure 100b will be omitted.

The laser radar 10 is a detector that detects an object around the vehicle using laser light (for example, infrared light). The laser radar 10 is, for example, a light detection and ranging (LiDAR). The laser radar 10 has an irradiation unit 10a that emits electromagnetic waves for detecting objects around the vehicle 1. The laser radar 10 emits laser light from the irradiation unit 10a to the surroundings of the vehicle, and detects the object by receiving the laser light reflected by the object. The object around the vehicle 1 includes, for example, another vehicle around the vehicle. The laser radar 10 here has an outer shape that is reduced in size compared to conventional laser radars. The laser radar 10 has, for example, a columnar outer shape, and the dimensions of the laser radar 10 are, as an example, about 5 cm in a longitudinal direction along the front and rear directions and about 3 cm in a short direction intersecting the longitudinal direction. The short direction includes the up-down direction and the left-right direction.

The installation hole 11 is a hole provided for placing the laser radar 10. The installation hole 11 is provided near a front pillar 3 on a windshield 2 of the vehicle 1, near a rear pillar on rear glass of the vehicle 1, near the front pillar 3 on a roof 4 of the vehicle 1, or near the rear pillar on the roof 4 of the vehicle 1. The installation hole 11 may be a through hole that allows the vehicle interior and the vehicle exterior to communicate with each other, or may be a non-through recess that is recessed toward the vehicle interior.

Here, as an example, the laser radar mounting structure 100 installed so that the laser radar 10 faces the front of the vehicle will be described. In the laser radar mounting structure 100, a through hole as the installation hole 11 is provided near the front pillar 3 on the windshield 2 of the vehicle 1. The front pillar 3 is a member constituting the body of the vehicle 1, and extends to the roof 4 along each of a pair of left and right side edge portions 2a of the windshield 2. The installation hole 11 is provided on the windshield 2 at a pair of left and right corners formed by the pair of left and right side edge portions 2a of the windshield 2 and the front end of the roof 4. That is, the installation holes 11 are provided at both of an upper right corner 2b and an upper left corner 2c in the windshield 2. Note that black edge portions 2d provided at edge portion in the windshield 2 are enlarged toward the center of the windshield 2 so as to include the portions where the installation holes 11 are provided in the upper right corner 2b and the upper left corner 2c of the windshield 2 respectively.

The installation hole 11 is provided above a height of the line of sight of an occupant in the vehicle 1 in the windshield 2 of the vehicle 1. "Above the height of the line of sight" means "above the upper limit of an average height of the line of sight of the occupant in the vehicle 1". As the average height of the line of sight of the occupant, for example, a height of lines of sight from the ground may be used, the lines of sight being included in a region in which a frequency of the lines of sight is equal to or higher than a predetermined frequency. The frequency of the the lines of sight may be calculated based on a statistical data of the lines of sight of a plurality of occupants collected in advance.

The opening shape of the installation hole 11 is, for example, a rectangular shape in a plan view of the vehicle 1. The longitudinal direction of the rectangular shape is along the front and rear direction. The opening dimension in the front and rear direction of the installation hole 11 may be greater than the dimension in the longitudinal direction of the laser radar 10. The opening dimension in the left and right direction of the installation hole 11 may be greater than the dimension in the short direction of the laser radar 10. The opening shape of the installation hole 11 is not limited to this example, and may be another shape such as a circular shape or an elliptical shape.

In the installation hole 11, the laser radar 10 is placed with the irradiation unit 10a facing forward to detect objects in front of the vehicle 1. In the example of FIG. 2, the laser radar 10 is placed in the installation hole 11 such that the axial direction of the laser radar 10 is oriented in the front and rear directions along the horizontal plane. The axial direction of the laser radar 10 may be inclined from the horizontal plane.

The laser radar 10 is placed in the installation hole 11 such that at least a portion of the laser radar 10 opposite the irradiation unit 10a is located in a passenger compartment of the vehicle 1. In the example of FIG. 2, the laser radar 10 is provided in the installation hole 11 such that the irradiation unit 10a protrudes further outward of the vehicle 1 than the windshield 2. The laser radar 10 is provided in the installation hole 11 such that a lower end and a rear end opposite to the irradiation unit 10a are positioned further inward of the vehicle 1 than the windshield 2. The laser radar 10 is located in the installation hole 11 via a bracket 13 of a cover member 12 described below.

The laser radar 10 is connected to a battery and an electronic control unit (ECU) of the vehicle 1 via a wire 10b. The wire 10b is an assembly component constituted by a bundle of a plurality of electric wires used for power supply and signal transmission. The laser radar 10 has a connection portion 10c on the back for connection to the wire 10b. The position of the connection portion 10c is not limited to the rear end of the laser radar 10. The connection portion 10c may be located on a lower surface, a side surface, or an upper surface of the laser radar 10. The wire 10b is positioned along the front pillar 3 to pass between the windshield 2 and an interior member 5, for example, and is connected to the laser radar 10. Here, the interior member 5 is a front pillar garnish.

The cover member 12 is a member provided in the windshield 2 so as to cover the installation hole 11 and the laser radar 10 from the outside of the vehicle. Here, the cover member 12 is a separate member from the laser radar 10. The cover member 12 is made of a material that transmits electromagnetic waves. In other words, the cover member 12 covers the laser radar 10 and transmits the laser radar 10 electromagnetic waves. The cover member 12 is, for example, resin-molded. The cover member 12 may be made of the same material as a bumper of the vehicle 1 or the like. The cover member 12 may be made of an acrylic polymer.

The cover member 12 is watertightly secured to the windshield 2 by an adhesive 12b in a peripheral edge 12a. The cover member 12 forms a shape along an upper half of the wing cross-section as a whole in a cross-sectional view along a vertical plane including the front and rear directions, for example. The height of the cover member 12 with respect to the windshield 2 decreases from the front toward the rear. The cover member 12 has a front wall portion 12c, a top plate portion 12d, and a side wall portion 12e.

The front wall portion 12c is a front wall portion constituting the cover member 12. The front wall portion 12c is located in front of the laser radar 10 and faces the irradiation unit 10a of the laser radar 10. That is, the laser radar 10 is provided on the installation hole 11 so that the irradiation unit 10a faces the outside of the vehicle 1 through the front wall portion 12c of the cover member 12.

As an example, the front wall portion 12c is a curved surface such that the central portion in the left and right direction protrudes forward. The lower end of the front wall portion 12c protrudes forward with respect to the upper end of the front wall portion 12c, and the entire the front wall portion 12c is inclined rearward. The lower end of the front wall portion 12c is a part of the peripheral edge 12a that is fixed to the windshield 2.

As shown in FIGS. 1 and 3, in a cross-sectional view along a horizontal plane, the front wall portion 12c extends in an arc shape including a fan-shaped an electromagnetic wave irradiation range 10d whose center is the irradiation unit 10a of the laser radar 10. As shown in FIG. 2, in a cross-sectional view taken along a vertical plane including the front and rear directions, the front wall portion 12c extends to a position higher than the irradiation unit 10a of the laser radar 10, and the inclination toward the rear increases toward the upper end. As a result, an increase in air resistance is suppressed, and generation of wind noise is suppressed.

The top plate portion 12d is a portion forming a roof portion of the cover member 12. The top plate portion 12d extends along the windshield 2 to cover the laser radar 10 above the laser radar 10. The posterior end of the top plate portion 12d is the portion of the peripheral edge 12a that is fixed to the windshield 2. The top plate portion 12d has, for example, an inclination with respect to the horizontal plane that is smaller than the windshield 2 and larger than the roof 4. As a result, the top plate portion 12d defines a space having a sufficient height to accommodate a portion of the laser radar 10 that protrudes further toward the vehicle exterior side than the windshield 2.

The side wall portion 12e is a pair of left and right wall portions constituting the cover member 12. The side wall portion 12e extends along the front and rear direction and the up-down direction. The side wall portion 12e decreases in height with respect to the windshield 2 toward the rear. The front end of the side wall portion 12e is continuous with each of a left end and a right end of the front wall portion 12c, and the top end of the side wall portion 12e is continuous with each of a left edge and a right edge of the top plate portion 12d. A lower end and a rear end of the side wall portion 12e are parts of the peripheral edge 12a that are fixed relative to the windshield 2.

The bracket 13 is a member that supports the laser radar 10. The bracket 13 is formed of plastic, for example, and is provided integrally with the cover member 12 so as to extend downward from a lower surface of the top plate portion 12d of the cover member 12. The bracket 13 may be formed by fixing a separate member made of plastic or metallic (aluminum or the like) to the top plate portion 12d. The bracket 13 may include, for example, a front bracket 13a supporting the front end side of the laser radar 10 and a rear bracket 13b supporting the back end side of the laser radar 10. The bracket 13 and the laser radar 10 may be fixed by fastening with bolts or the like, for example, but are not particularly limited thereto.

A procedure for attaching the laser radar 10 in the laser radar mounting structure 100 as described above will be described. First, a pair of the installation hole 11 are formed in the upper right corner 2b and the upper left corner 2c of the windshield 2. The laser radar 10 is attached to the bracket 13 of the cover member 12. In each of the pair of the installation hole 11, the cover member 12 is attached to the windshield 2 so that the irradiation unit 10a of the laser radar 10 supported by the bracket 13 faces the outside of the vehicle 1 via the cover member 12. The windshield 2 may be marked (painted, recessed or raised) to position the cover member 12 with respect to the windshield 2. When the cover member 12 is attached to the windshield 2, the cover member 12 is watertightly fixed to the windshield 2 by interposing the adhesive 12b between the peripheral edge 12a and the windshield 2 of the cover member 12. Thus, as shown in FIGS. 1 to 3, the laser radar 10 is attached to the vehicle 1.

Figure 4:
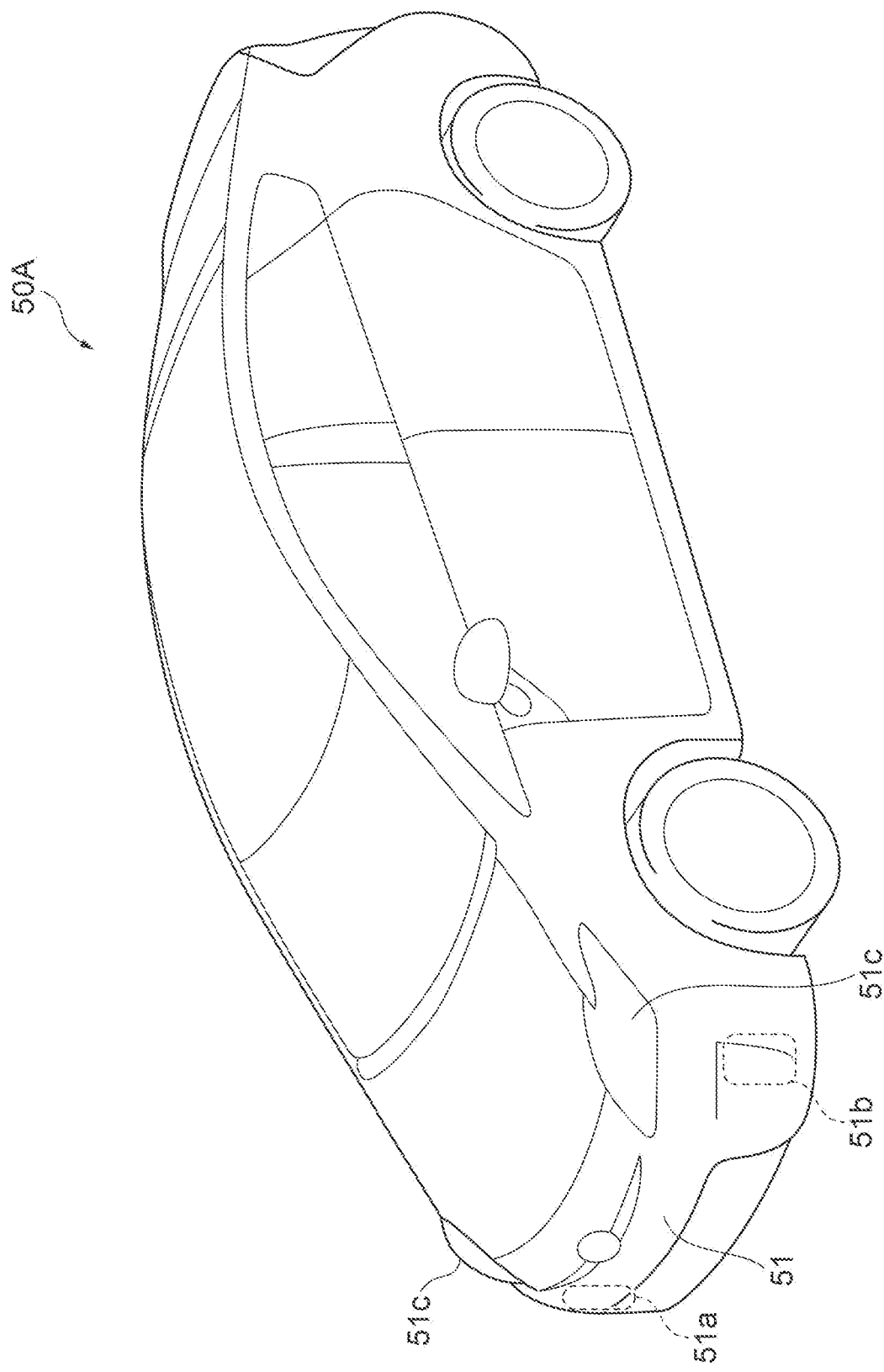
FIG. 4 is a perspective view of a vehicle including a laser radar mounting structure according to a comparative example.

FIG. 4 is a perspective view of a vehicle including a laser radar mounting structure according to a comparative example. FIG. 4 shows a vehicle 50A with laser radars attached to a right end portion 51a and a left end portion 51b of a front bumper 51. In such a laser radar attached to each of the right end portion 51a or the left end portion 51b, since the installation height of the laser radar is low, it may be difficult to detect an object located far from the vehicle 50A. In addition, for example, even if a laser radar is provided inside a headlight 51c, it may be difficult to detect an object located far from the vehicle 50A by the laser radar because the height of the headlight 51c above the ground is equal to or less than a predetermined height due to regulations or the like.

In this regard, according to the laser radar mounting structure 100 according to one aspect of the present disclosure, the laser radar 10 is provided in the installation hole 11. The installation hole 11 is located near the front pillar 3 on the windshield 2 of the vehicle 1. As a result, the laser radar 10 can be attached to a higher position of the vehicle 1 than in a case where the laser radar 10 is provided in an in-vehicle headlamp, for example. Further, the laser radar 10 is provided near the front pillar 3 and is covered with the cover member 12 that transmits electromagnetic waves. As a result, the laser radar 10 is less conspicuous when viewed from the outside of the vehicle 1, and thus the influence on the exterior appearance of the vehicle 1 can be suppressed. Therefore, according to the laser radar mounting structure 100, the laser radar 10 can be mounted at a high position in the vehicle 1 while considering the influence on the exterior appearance of the vehicle 1.

According to the laser radar mounting structure 100, the laser radar 10 is provided in the installation hole 11 such that the irradiation unit 10a protrudes further outside the vehicle 1 than the windshield 2. As a result, the irradiation unit 10a of the laser radar 10 radiates electromagnetic waves to the outside of the vehicle 1 through the cover member 12, not through the windshield 2. Therefore, attenuation of electromagnetic waves due to the windshield 2 can be suppressed.

According to the laser radar mounting structure 100, the installation holes 11 are provided in both the upper right corner 2b and the upper left corner 2c in the windshield 2. Accordingly, it is possible to arrange the laser radar 10 in the windshield 2 of the vehicle 1 while preventing the field of view of the driver from being disturbed.

It should be noted that the upper right corner 2b and the upper left corner 2c in the windshield 2 are unlikely to interfere with the wiping area of a wiper of the windshield 2 in the vehicle 1. Therefore, according to the laser radar mounting structure 100, it is possible to provide a layout of the laser radar 10 that is not easily affected by the wiping area of the wiper of the windshield 2. In addition, the detection of the object positioned in front of the vehicle 1 using the laser radar 10 is less affected by the operation of the windshield wiper.

Figure 5:
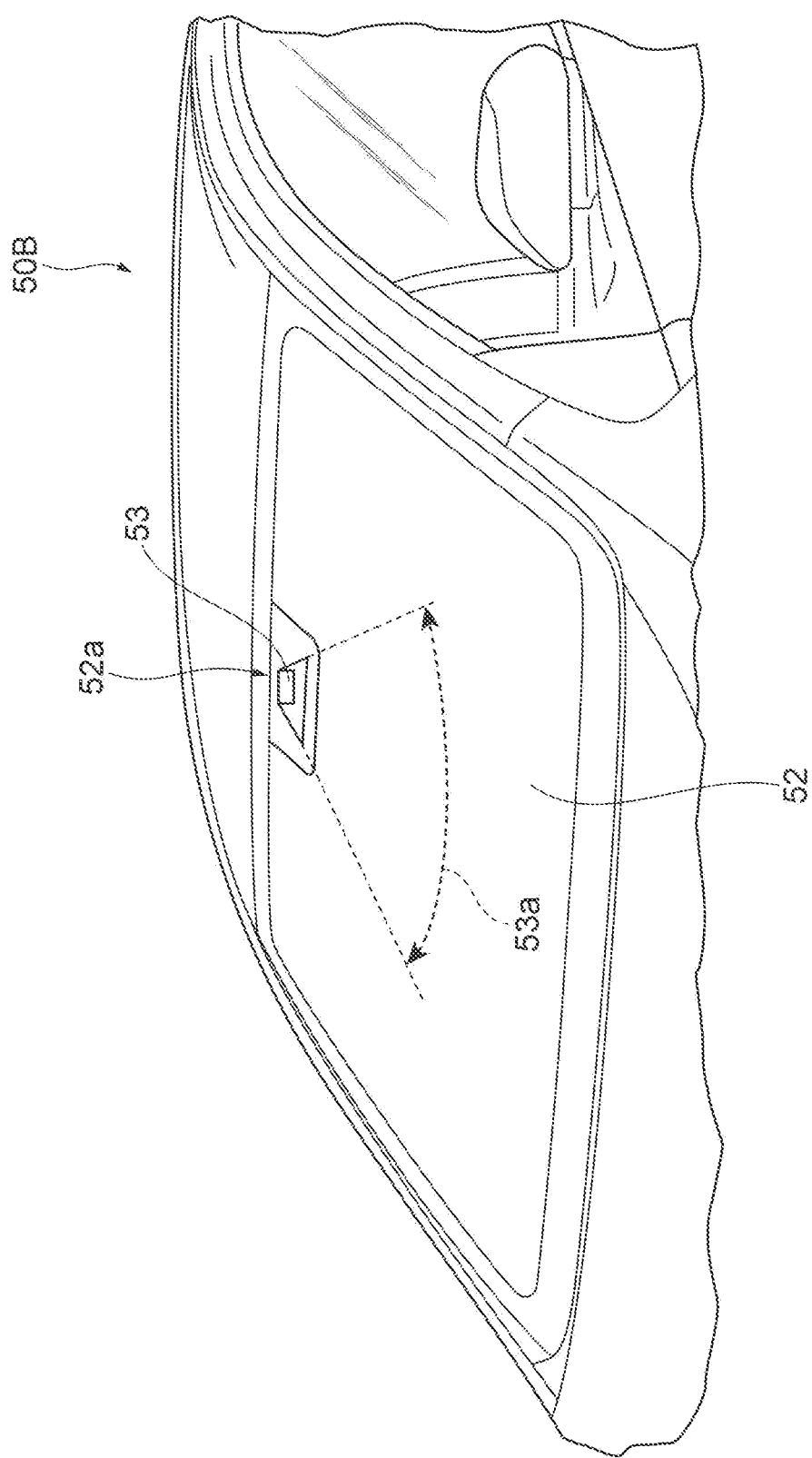
FIG. 5 is a perspective view illustrating the laser radar mounting structure according to the comparative example.

For example, as illustrated in FIG. 5, a configuration is assumed in which one laser radar is disposed in a upper central portion 52a of a windshield 52 of a vehicle 50B instead of a camera 53 provided in the upper central portion 52a of the windshield 52. The laser radar here has a limited range of an electromagnetic wave irradiation range 53a in the left and right direction, similar to the laser radar 10 with the electromagnetic wave irradiation range 10d. For this reason, compared to a case where a plurality of laser radars are arranged in the left and right direction, the one laser radar disposed in the upper central portion 52a may fail to detect an object positioned in front of the vehicle 50B. In this regard, according to the laser radar mounting structure 100, it is possible to appropriately detect an object located in front of the vehicle 1 by arranging the laser radars 10 in both the upper right corner 2b and the upper left corner 2c in the windshield 2.

Further, the laser radar 10 is provided in the installation hole 11 such that the irradiation unit 10a protrudes outside the vehicle 1 than the windshield 2. As a result, electromagnetic waves from the irradiation unit 10a are less likely to be disturbed by the front pillar 3. In other words, it is possible to prevent a blind spot from occurring farther than the front pillar 3. In addition, the interior member 5, which is a front pillar garnish, hides the laser radar 10 including the wire 10b disposed at the upper right corner 2b and the upper left corner 2c in the windshield 2 from the vehicle interior side. Therefore, the field of view of the driver is less likely to be hindered compared to a case where the laser radar is disposed in the upper central portion 52a or the like.

Modification

Although the embodiments of the present disclosure have been described above, the present disclosure is not limited to the above-described embodiments. The present disclosure can be implemented in various forms in which various modifications and improvements are made based on the knowledge of those skilled in the art, including the above-described embodiments.

In the above-described embodiment, the laser radar 10 is provided in the installation hole 11 so that the irradiation unit 10a protrudes further to the outside of the vehicle 1 than the windshield 2, but the present disclosure is not limited thereto. For example, the entire the laser radar 10 including the irradiation unit 10a of the laser radar 10 may be disposed in the vehicle cabin of the windshield 2 as long as the irradiation unit 10a can emit electromagnetic waves to the front of the vehicle 1 via the installation hole 11.

In the above embodiment, the installation holes 11 are provided in both the upper right corner 2b and the upper left corner 2c in the windshield 2. The installation hole 11 may be provided at least in the upper right corner 2b and the upper left corner 2c in the windshield 2.

The installation hole 11 may not necessarily be provided at the upper right corner 2b and the upper left corner 2c in the windshield 2. In short, the installation hole may be provided near the front pillar 3 on the windshield 2 in the vehicle 1, near the rear pillar on the rear glass in the vehicle 1, near the front pillar 3 on the roof 4 of the vehicle 1, or rear pillar on the roof 4 of the vehicle 1. In this case, the vehicle may be installed so that the laser radar 10 faces the rear of the vehicle. As near the front pillar 3 on the roof 4 in the vehicle 1, for example, installation holes may be provided at a right front corner 4a and a left front corner 4b on the roof 4 in the vehicle 1. The right front corner 4a and the left front corner 4b are the front-end corners of the roof 4 included in a forward projection area of the vehicle 1. In addition, as near the rear pillar on the roof 4 of the vehicle 1, for example, installation holes may be provided in the right rear corner portion and the left rear corner portion on the roof 4 of the vehicle 1. The right rear corner portion and the left rear corner portion are corner portions on the rear end of the roof 4 included in a rear projection area of the vehicle 1. In consideration of the fact that the roof 4 of the vehicle 1 is painted and the cover portion is likely to protrude upward, the exterior appearance is less restricted when the installation hole 11 is provided on the windshield 2 or the rear glass than provided on the roof 4.

In the above-described embodiment, the cover member 12 and the windshield 2 are adhered to each other. For example, the cover member 12 may be secured to the windshield 2 with a protrusion projecting toward the windshield 2 and engaging the windshield 2.

Although the laser radar 10 is supported by the bracket 13 of the cover member 12 in the above-described embodiment, the present disclosure is not limited thereto. The bracket 13 may, for example, be provided directly on the windshield 2 by claw-like projections or by adhesive. The bracket 13 may be provided in the interior member 5. The laser radar 10 may be attached via other members in addition to the bracket 13.

In the above-described embodiment, the cover portion is the cover member 12 separate from the laser radar 10, but the cover portion may be formed integrally with the housing of the laser radar 10.

What is claimed is:

1. A laser radar mounting structure for mounting a laser radar to a vehicle, the laser radar having an irradiation unit configured to irradiate an electromagnetic wave for detecting an object around the vehicle, the laser radar mounting structure comprising:
    an installation hole provided near a front pillar on a windshield of the vehicle, or near a rear pillar on a rear glass of the vehicle;
    the laser radar provided in the installation hole;
    a cover portion that covers the laser radar and transmits the electromagnetic wave; and
    a bracket that supports the laser radar;
    wherein the cover portion includes a top plate portion that covers the laser radar from above;
    wherein the laser radar is provided in the installation hole such that the irradiation unit faces an outside of the vehicle through the cover portion;
    wherein the laser radar is provided in the installation hole such that the irradiation unit protrudes to an outside of the vehicle from the windshield or the rear glass;
    wherein the installation hole is provided at least at an upper right corner and an upper left corner of the windshield;
    wherein the bracket extends downward from the top plate portion;
    wherein the bracket is connected to an upper portion of the laser radar; and
    wherein a vehicle interior and a vehicle exterior communicate with each other through the installation hole below the laser radar.

2. The laser radar mounting structure according to claim 1, wherein:
    the cover portion includes a front wall portion located in front of the laser radar, the front wall portion being a curved surface such that a central portion in a left and right direction protrudes forward;
    a lower end of the front wall portion protrudes forward with respect to an upper end of the front wall portion; and
    the entire front wall portion is inclined rearward.

3. The laser radar mounting structure according to claim 2, wherein:
    the front wall portion, in a cross-sectional view along a horizontal plane, extends in an arc shape including a fan-shaped electromagnetic wave irradiation range whose center is the irradiation unit;

the front wall portion, in a cross-sectional view along a vertical plane including a front and rear direction, extends to a position higher than the irradiation unit; and an inclination of the front wall portion toward the rear increases toward an upper end of the front wall portion.

4. The laser radar mounting structure according to claim 3, wherein the top plate portion, in a cross-sectional view along a vertical plane including a front and rear direction, has an inclination with respect to a horizontal plane that is smaller than an inclination of the windshield and larger than an inclination of a roof of the vehicle.

* * * * *